United States Patent
Harris et al.

(10) Patent No.: US 6,866,469 B2
(45) Date of Patent: Mar. 15, 2005

(54) PALLET LOADING APPARATUS

(75) Inventors: Richard D. Harris, Indianapolis, IN (US); Achie B. Russell, Connersville, IN (US)

(73) Assignee: Systec, Inc., Indianapolis, IN (US)

( * ) Notice: Subject to any disclaimer, the term of this patent is extended or adjusted under 35 U.S.C. 154(b) by 0 days.

(21) Appl. No.: 09/915,054

(22) Filed: Jul. 25, 2001

(65) Prior Publication Data

US 2003/0021670 A1 Jan. 30, 2003

(51) Int. Cl.$^7$ .............................................. B65G 57/10
(52) U.S. Cl. ................................ 414/793.4; 414/794.3; 414/794.7
(58) Field of Search ........................ 414/793.4, 794.3, 414/794.7, 794.8

(56) References Cited

U.S. PATENT DOCUMENTS

| | | | | |
|---|---|---|---|---|
| 2,768,756 A | * | 10/1956 | Horman | 414/794.3 X |
| 4,162,016 A | * | 7/1979 | Schmitt | 414/794.3 |
| 4,195,959 A | * | 4/1980 | Schmitt | 414/794.3 X |
| 4,764,074 A | | 8/1988 | Postigo | |
| 4,815,924 A | * | 3/1989 | Jaatinen | 414/794.3 |
| 5,951,238 A | | 9/1999 | Duecker | |

FOREIGN PATENT DOCUMENTS

JP     55-66448    *   5/1980

* cited by examiner

*Primary Examiner*—Janice L. Krizek
(74) *Attorney, Agent, or Firm*—Maginot, Moore & Beck (57) ABSTRACT

An apparatus for transferring an article onto a pallet is situated between conveyor sections. The apparatus includes a pusher mechanism arranged to push the article from a location at or adjacent to the first conveyor section toward a pallet disposed on the second conveyor section. An extension fork assembly is provided between the pusher mechanism and the pallet. The extension fork assembly defines a stationary transfer surface over which the article travels on its path toward the pallet. The assembly also includes a plurality of extension forks that are extended over the pallet. The article is pushed onto the extension forks until the article is situate over the pallet. The extension forks are then retracted while the article is held in position over the pallet by the pusher mechanism. When the forks are completely retracted the article is safely sitting directly on the pallet.

14 Claims, 4 Drawing Sheets

PALLET LOADING APPARATUS

BACKGROUND OF THE INVENTION

The present invention relates to a pallet loading apparatus, and more specifically to an apparatus for loading a pallet carried by one conveyor with articles or containers transferred from another conveyor.

Pallets are extensively used within processing plants to transfer work in process between work stations. In addition, pallets are the mode of choice for conveying raw materials and finished products from one location to another.

In its most rudimentary form, palletizing of articles to be conveyed is accomplished by manual labor—i.e., a human operator manually places an article or articles on a pallet. Of course, manual palletizing is limited by the speed and mobility of the human operator.

Automatic palletizing or stacking of articles on pallets has been around for quite awhile. In an optimum scenario, articles to be stacked and shipped by pallet are transported by conveyor from a finishing station. A second conveyor is provided for discharge of pallets carrying articles stacked thereon. In such an installation, the pallet themselves are fed from a separate supply.

Figure 1:
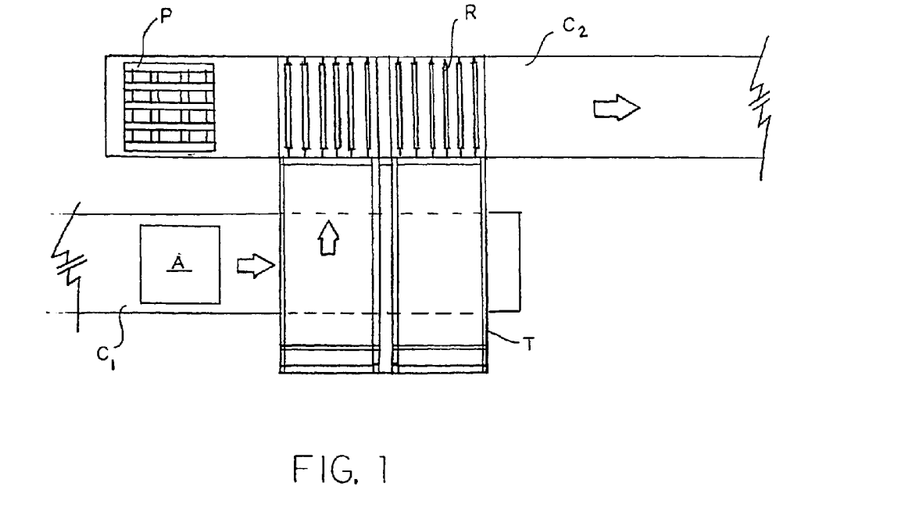
FIG. 1 is a top plan-view of a pallet loading conveyor system.

Such a configuration is depicted generally in FIG. 1. Specifically, a series of articles A are conveyed by a conveyor $C_1$ to a transfer apparatus T. A second conveyor $C_2$ transports a pallet P situated thereon. In one typical installation, a series of rollers R disposed within the second conveyor $C_2$ are aligned with a discharge end of the first conveyor $C_1$. The transfer apparatus T transports the article A onto a pallet P when it is situated on the rollers R.

In a typical installation, the article A is conveyed onto the transfer apparatus T by the first conveyor $C_1$. The transfer apparatus T includes a pusher component that pushes the article onto an awaiting pallet. Once the article has been loaded, the second conveyor $C_2$ operates to carry the loaded pallet away.

One problem that must be overcome with an automatic palletizing system is the smooth transfer of the article A onto an awaiting pallet P. In many cases, this transfer can be accomplished by simply pushing the article A directly onto the pallet. However, certain articles, raw materials or products make this approach problematic. For instance, where the article A is a stack of sheet material, this approach is highly unsatisfactory. The lower-most sheets in this stack are prone to being destroyed as they are pushed onto the rough surface of the pallet. Moreover, if enough of the sheet material binds against the pallet, the transfer operation is comprised and can be interrupted.

In one typical prior approach, the stacked article is lifted while a pallet is directed underneath the elevated load. The article is then lowered onto the pallet and the pallet is discharged on an exit conveyor. The patent of Postigo, U.S. Pat. No. 4,764,074 is representative of pallet loading apparatus of this type. As explained more fully in this patent, the stacked article is conveyed to a lifting station where a number of forks, interleaved between conveyor rollers, are slid beneath the stacked articles and used to lift the articles off the conveyor rollers. The pallet is then introduced onto the conveyor rollers directly beneath the elevated load supported by the forks. As the forks are retracted, the load settles onto the pallet for discharge.

One significant difficulty with this approach is that the stacked article or product must be conveyed to the transfer apparatus, lifted and then later dropped onto the pallet. After the load is mounted on the pallet, the lifting forks must be removed before the article and pallet can continue their travel along the discharge conveyor. This approach is much more time consuming than simply pushing the product onto a pallet that is momentarily stopped at a transfer apparatus.

Consequently, there remains a need for a pallet loading apparatus that is adapted to easily convey sheet material onto a pallet. This need encompasses the desire to make this transfer operation occur as quickly as possible to permit high-speed pallet loading.

SUMMARY OF THE INVENTION

In order to address these unresolved needs, the present invention contemplates an apparatus for loading or transferring an article from a first conveyor section onto a pallet situated on a second conveyor section. The apparatus includes a pusher mechanism for pushing the article from the first to the second conveyor section. An extension fork assembly is interposed between the conveyor sections to facilitate the transfer of the article onto the pallet.

In one aspect of the invention, the extension fork assembly includes a transfer surface that remains stationary between the two conveyor sections. The transfer surface is configured to support the article as it is pushed thereacross by the pusher mechanism. In a preferred embodiment, the transfer surface is defined by a plurality of elongated beams extending between the first and second conveyor sections. In a specific embodiment, the elongated beams are integrated into the framework of the extension fork assembly. Preferably, the beams are curved and are formed of a smooth or low-friction material to facilitate sliding the article across the beams.

In an important aspect of the invention, the extension fork assembly includes a plurality of elongated forks that are initially disposed adjacent the transfer surface, or more specifically the elongated beams. A drive mechanism is provided to translate the elongated forks from their initial, or retracted, position to an extended position in which the forks are adjacent the pallet supported on the second conveyor section.

Most preferably, the second conveyor section is oriented relative to the extension fork assembly so that the conveyor surface is below the level of the extension forks. In a most preferred embodiment, the second conveyor section is oriented so that the upper surface of a pallet situated on the conveyor is immediately beneath and in close proximity to the extended forks. The free ends of the forks can be beveled on the top and bottom faces of the forks. The beveling on the bottom face of the forks can allow the fork to ride up the side of a pallet as the forks are extended, thereby minimizing the risk that the forks will become impaled on a pallet.

The extended forks provide an additional support surface for the article to be loaded as it is pushed toward the second conveyor section. Thus, the pusher mechanism is calibrated so that its stroke is sufficient to push the article from the proximity of the first conveyor section to a position immediately above the pallet on the second conveyor section. In this position, the extended forks support the article above the pallet.

The combination of the stationary transfer surface and the support surface of the extended forks allows the article to be pushed toward the pallet without fear of the article binding along the transfer apparatus or on the pallet. This aspect of the invention renders the transfer apparatus particularly well-suited for palletizing sheet material, such as stacks of paper or cardboard sheets. In the preferred embodiment of the invention, the support surface defined by the elongated forks is situated at or slightly below the level of the stationary support surface to ensure a smooth passage of the article onto the pallet.

In a further feature of the invention, the extension fork assembly includes a plurality of parallel forks that are interleaved between adjacent parallel elongated beams. The assembly further includes a drive mechanism for translating the forks between the retracted and extended positions. In a preferred embodiment, this drive mechanism includes a pair of parallel lead screws. Each lead screw carries a drive nut that threads along the length of the corresponding lead screw as the screw rotates.

Each drive nut is connected to a number of the elongated forks. In a preferred feature, one end of each of the elongated forks is connected to a trolley assembly that is translatably supported by a guide channel arrangement. The drive nut is then connected to the trolley assembly so that translation of the drive nut leads to translation of the trolley assembly and ultimately of the elongated forks. A single drive motor can be connected via a transmission arrangement to drive each of the lead screws so that the elongated forks are deployed evenly and in unison.

In the preferred embodiment, the free end of each of the elongated forks is supported by an idler roller assembly. Each fork is supported by its own idler roller and each roller is preferably mounted on a common shaft. Thus, each fork is supported in two places even as the fork is moved to its extended position. In the extended position, the elongated forks are essentially cantilevered on the idler roller assembly as the forks project beyond the end of the extension fork assembly.

In accordance with the most preferred embodiment of the invention, the pusher mechanism includes an electrically controlled motor. Limit switches or sensors can be situated within the transfer apparatus to control the extent of movement of the pusher mechanism. Likewise, the drive mechanism for the extension forks can include and electrically controlled motor and limit switches or sensors to determine when the forks have reached their retracted or extended positions. The limit switches or sensors can then transmit an appropriate signal to the corresponding electrically controlled motor to activate, deactivate or reverse the motor as required for the operation of the inventive transfer apparatus.

The present invention further contemplates a method for transferring an article onto a pallet. This method is best accomplished by the inventive transfer apparatus described above. In accordance with the invention, the article to be transferred is dispensed from a first conveyor section onto a transfer apparatus. A number (most preferably a plurality) of elongated forks are extended from the transfer apparatus over the pallet situated on a second conveyor section. The article is then slid along a stationary transfer surface of the transfer apparatus.

As the article continues to slide, it reaches the elongated forks that are at least partially extended, but preferably fully extended over the pallet. The article continues its travel along the extended forks until the article is situated directly above the pallet. The elongated forks are then retracted while the article is held in position over the pallet. When the forks are fully retracted, the article is sitting directly on the pallet and the loaded pallet is ready to be conveyed to another station by the second conveyor section.

The article is conveyed first along the stationary transfer surface and then along the elongated forks in a suitable manner. In the preferred embodiment, this manner includes a pusher mechanism that directly pushes the article from its initial position adjacent the first conveyor section to its loaded position above the pallet on the second conveyor section. Other approaches for feeding the article toward its loaded position are also contemplated, such as a gravity feed arrangement.

In the preferred embodiment, a motor-driven pusher mechanism operates in synchronization with a motor-driven extension fork assembly. In a most preferred method of the invention, the elongated forks begin their extension first, followed by activation of the motor-driven pusher mechanism. Initiation of the pusher mechanism can be accomplished by an electrical or electronic control system for the two motors, or by activation of a limit switch or sensor at a predetermined location in the initial travel of the extension fork assembly.

Once the pusher mechanism is activated, it continues to push the article toward the second conveyor section, causing the article to slide along the stationary transfer surface. The movement of the motor-driven extension fork assembly is coordinated so that the forks are fully extended over the pallet prior to arrival of the pushed article onto the support surfaces of the elongated forks. The pusher mechanism continues its operation to push the article onto the extended forks so that the forks support the article directly above the pallet. The motor-driven pusher mechanism can then be deactivated once the article reaches its loaded position.

With the pusher mechanism deactivated, the motor driving the extension forks is then reversed in accordance with one step of the inventive method. This causes the extension forks to retract away from pallet. The article is held in position by the deactivated pusher mechanism while the forks are pulled from underneath the article. When the forks have retreated to their retracted position, the article is seated directly on the pallet. Preferably, the forks have beveled tips to effect a smooth transition of the article from its support by the forks. In a most preferred embodiment, the bevel extends over a substantial length from the free tip of each fork to eliminate the risk of tipping of articles having high centers of gravity or narrow profiles.

It is one object of the invention to provide an apparatus for transferring or loading an article onto a pallet, most preferably between two conveyor sections. A further object is to achieve this transfer without significant interruption in the process flow through the conveyor system.

One significant benefit of the present invention is that it is readily adaptable to transfer or load articles that include sheet material, such as cardboard sheets. Another benefit realized by the invention is that this transfer is accomplished without raising and/or lowering the article to be loaded on the pallet to carry the article.

Other objects and benefits of the present invention can be readily gleaned from the following written description and the accompanying figures.

DESCRIPTION OF THE PREFERRED EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended. The inventions includes any alterations and further modifications in the illustrated devices and described methods and further applications of the principles of the invention which would normally occur to one skilled in the art to which the invention relates.

The present invention contemplates a system for transferring a stacked article, such as article A depicted in FIG. 1, from one conveyor to a pallet supported on another conveyor. Thus, as described above, the present invention can be used to interface between two parallel conveyor sections $C_1$ and $C_2$. A pallet P can be loaded onto the second conveyor $C_2$ by conventional means. Likewise, the article A, which can be of a variety of configurations, is also transferred to the first conveyor $C_1$ in a known manner. In the illustrated embodiment, the two conveyor paths are shown as being parallel; however, the present invention has application to a wide range of conveyor designs and arrangements. In the illustrated embodiment, the pallet P is held momentarily on a roller conveyor R directly adjacent a transfer apparatus T at the discharge end of the first conveyor $C_1$.

Figure 2:
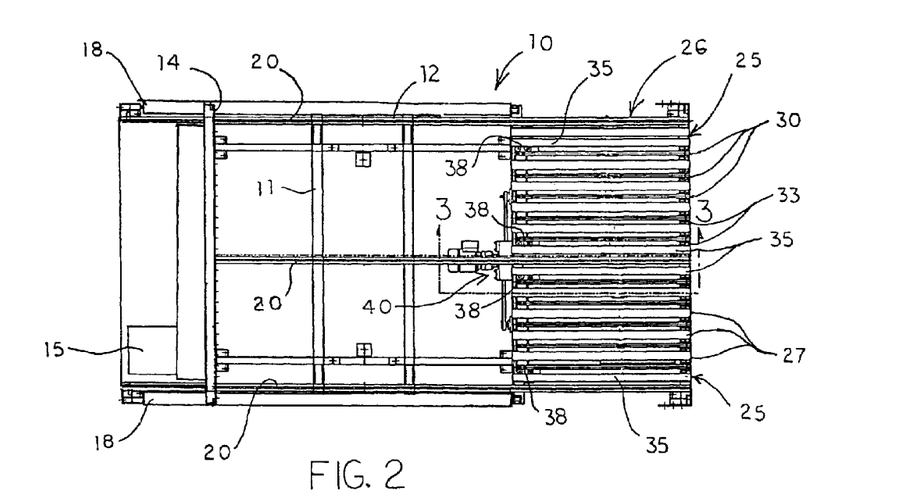
FIG. 2 is a top elevational view of transfer apparatus for use with the pallet loading system depicted in FIG. 1.

In accordance with a preferred embodiment of the present invention, the transfer apparatus T shown in FIGS. 1 can be in the form of a transfer apparatus 10 illustrated in FIG. 2. The transfer apparatus 10 can include a support frame 11 that can be connected to or integrated into the conveyor $C_1$ in a known manner. The support frame 11 permits the article A to be transported directly from the conveyor $C_1$ to an input portion 12 of the transfer apparatus 10.

The transfer apparatus 10 can include a pusher mechanism that in the illustrated embodiment includes a pusher bar 14 propelled by a pusher drive 15.The pusher bar and drive can be of generally any known configuration. The object of the pusher bar is to propel the article A from the first conveyor $C_1$ or from the input portion 12 onto a pallet P sitting on the second conveyor $C_2$. Again, the pusher bar 14 and drive 15 can be configured to integrate cleanly with the conveyor section $C_1$. For instance, in one embodiment the conveyor $C_1$ can be a continuous belt conveyor. The transfer apparatus 10 can include a leading roller 18 and weldment beams 20 to support the article A as it is propelled from the conveyor $C_1$ onto the transfer apparatus. The support frame can further include an array of beams or rollers to support the article at the input portion 12 of the transfer apparatus. Alternatively, the transfer apparatus can be integrated directly into a roller conveyor constructions with the support frame 11 integrated into the support frame for the roller conveyor $C_1$. The pusher bar 14, of course, is disposed above the conveyor to act directly on the article A.

In accordance with the present invention, the transfer apparatus 10 includes an extension fork assembly 25 that is disposed at one end of the transfer apparatus and configured to reside immediately adjacent the second conveyor $C_2$. The extension fork assembly 25 includes a stationary transfer surface 26 that, in the preferred embodiment, is defined by an array of parallel skid beams 27. By stationary it is meant that the surface 26 and/or skid beams 27 are capable of supporting the article A, but do not translate between the input portion 12 and the second conveyor section $C_2$.

In accordance with one aspect of the invention, the pusher bar 14 pushes the article A across the skid beams 27. In a specific embodiment, the beams are formed of steel to provide a relatively smooth surface for the article A to slide across. Most preferably, the beams 27 have a rounded or curved upper surface 28 to minimize the frictional contact with the article A travelling thereacross.

Figure 3:
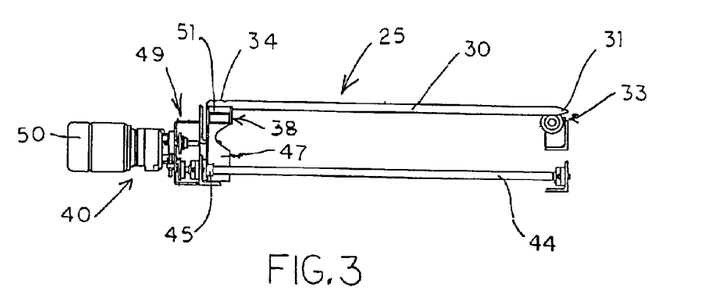
FIG. 3 is a side-elevational view of an extension fork assembly, forming part of the transfer apparatus illustrated in FIG. 2.

In an important feature of the present invention, a plurality of extension forks 30 are interleaved between the skid beams 27. Preferably, a greater number of beams 27 than forks 30 are provided. The number of beams and forks that are provided is dependent upon the weight of the article A being transferred onto the pallet. As shown in FIG. 3, each of the extension forks 30 can terminate in a beveled tip 31. In addition, The extension forks are each supported by an idler roller assembly 33 that allows the forks 30 to glide smoothly along the assembly 33 and extend beyond the end of the transfer apparatus 10. The opposite end 34 of each of the extension forks 30 is supported on a trolley guide channel beam 35 by way of a trolley assembly 38. A drive mechanism 40 is engaged to the trolley assembly 38 to simultaneously propel each of the extension forks 30 beyond the end of the transfer apparatus 10.

Figure 4:
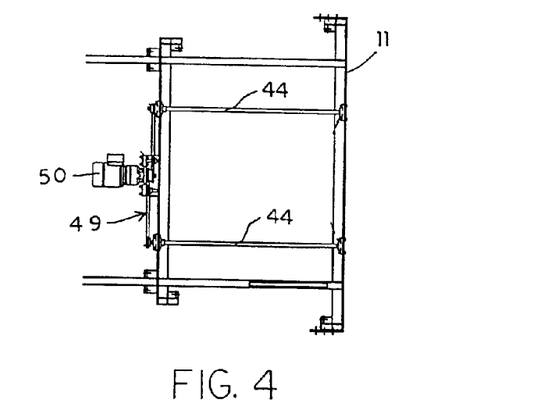
FIG. 4 is a top elevational view of the drive mechanism for the extension fork assembly shown FIG. 3.
Figure 5:
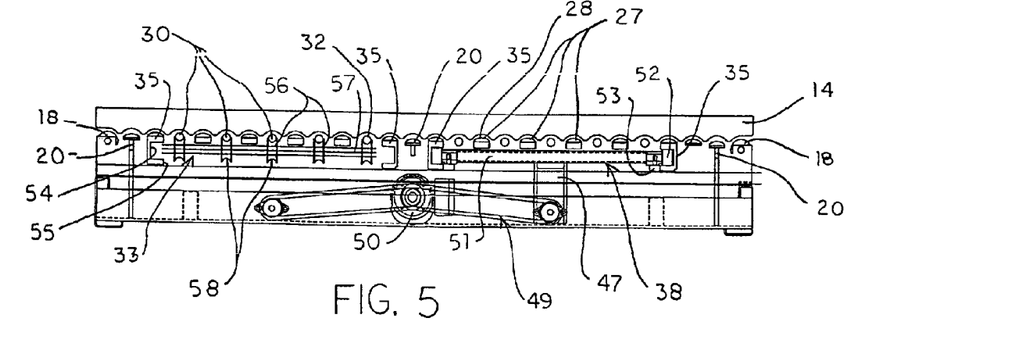
FIG. 5 is an end view of the transfer apparatus illustrated in FIG. 2 with partial cut-away showing details of the extension fork assembly.

Referring to FIGS. 3–5, details of the extension fork assembly 25 can be discerned. In particular, the drive mechanism 40 can include a pair of lead screws 44 that are uniformly situated across the width of the transfer apparatus 10. A drive nut 45 is engaged on each of the lead screws 44. This drive nut is mounted to a drive plate 47, to which the trolley assembly 38 for each of the extension forks 30 is connected.

Each of the lead screws 44 is rotationally supported within the frame 11. The driven end of each of the lead screws 44 is coupled to a drive motor 50 by way of a transmission 49. In the preferred embodiment, the transmission 49 can be a chain or pulley drive arrangement. A chain drive transmission 49 is most preferred between a drive gear on the motor 50 and driven gears fixed to the lead screws 44 to maintain direct and exact synchronization of rotation between the screws.

The transmission 49 ensures that rotation of the drive motor 50 produces corresponding identical rotation of each of the lead screws 44. As the lead screws rotate, each drive nut 45 is progressively threaded down the length of the lead screws 44. As each drive nut 45 traverses the length of the lead screws, it carries a corresponding drive plate 47 and trolley assembly 38 of the extension fork assembly 25. As a result, rotation of the lead screw 44 leads directly to parallel translation of all of the extension forks 30 as the trolley assemblies 38 are carried along by the drive nut.

Referring now to FIG. 5, details of the trolley assembly 38 and guide channel beam 35 can be seen. In particular, in the preferred embodiment, the trolley assembly 38 includes a support bar 51 spanning across a plurality of forks 30. The supported end 34 of each fork is mounted to the support bar 51 by a threaded fastener or other suitable means.

Vertical rollers 52 rotatably mounted at each end of the support bar 51 of the trolley assembly 38. Likewise, the trolley assembly includes opposite lateral rollers 53 at the ends of the support bar 51. The vertical rollers 52 are configured to roll within the channel 54 of the beam 35, while the lateral rollers 53 are arranged to roll along the lower edge 55 of the beam. The combination of the vertical and lateral rollers 52, 53, provides for stable movement of the trolley assembly 38 and the extension forks 30 mounted thereto. In addition, the combination of the vertical and lateral rollers prevents the trolley assembly 38 from binding as it rolls between opposite guide channel beams 35.

As described above, the free ends of the extension forks 30 are supported by an idler roller assembly 33. In the preferred embodiment, a corresponding number of idler rollers 56 are mounted on an idler shaft 57. The idler shaft 57 is rotatably supported by the frame 11 in a known manner, such as by bushings or bearings mounted within the frame and supporting the opposite ends of the shaft 57.

Each of the idler rollers 56 preferably defines a circular groove 58 for receiving an extension fork therein. In the most preferred embodiment, each of the extension forks 30 has a circular cross-section to correspond with the circular groove 58 within the idler roller 56. As depicted in FIG. 3, each of the extension forks 30 is supported at one end by the trolley assembly 38 and drive plate 47, and at its opposite free end by the idler roller assembly 33.

In the preferred embodiment, the upper surface 32 of each of the forks 30 is situated at or below the stationary transfer surface 26, or more particularly below the level of the curved surface 28 of the skid beams 27. Thus, the article A will not bind on the forks as it is conveyed across the transfer surface 26 to the extended forks 30.

In a further aspect, the extension fork assembly 25 is elevated relative to the second conveyor section $C_2$ so that the extended forks are offset from the conveyor. More specifically, as shown in FIGS. 6a–c, the idler roller assembly 33 supports the forks so that they sit directly above the pallet P when extended.

Figure 6A:
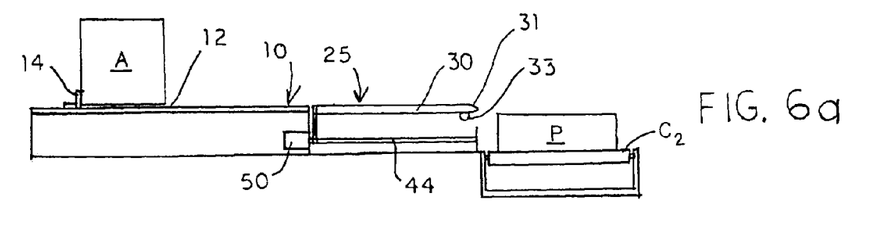
FIGS. 6a–6f are side pictorial representations of the sequence of operation of the transfer apparatus illustrated in the prior Figures.

The operation of the transfer apparatus 10, in particular, the fork extension assembly 25, is depicted in the sequential FIGS. 6a–6f. As shown in FIG. 6a, an article A is disposed on the input portion 12 of the transfer apparatus 10 adjacent the pusher bar 14. The extension forks 30 are initially in their neutral or non-extended position. In this position, the free ends 31 of the forks 30 are supported by the idler roller assembly 33. As also illustrated in FIGS. 6a, a pallet P has been conveyed along the conveyer $C_2$ so that it is immediately adjacent the discharge end of the transfer apparatus 10.

Figure 6B:
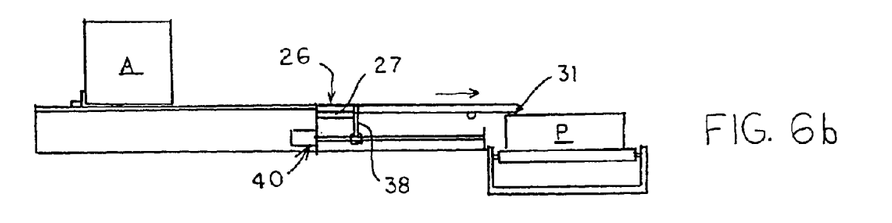

In the next step depicted in FIG. 6b, the drive mechanism 40 is activated to propel the extension fork assembly 25 forward. In so doing, the beveled tip 31 of each the extension forks 30 passes over the pallet P. At this point, the article A remains at input portion 12 of the transfer apparatus.

Figure 6C:
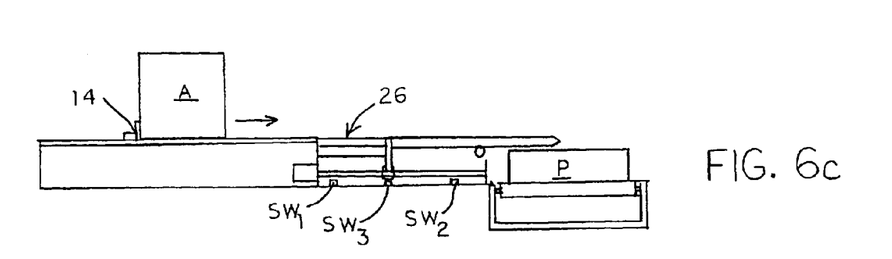
Figure 6D:
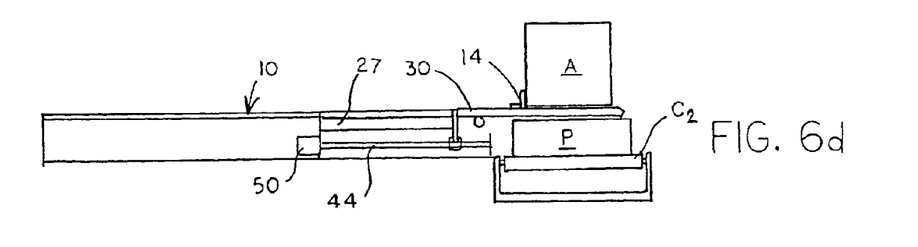

The drive mechanism 40 continues to push the extension forks 30 over the pallet P, as shown in FIG. 6c. At some point during the stroke of the extension forks 30, the pusher bar 14 can be activated to begin pushing the article A toward the pallet loading location. As shown in FIG. 6d, the pusher bar 14 continues to push the article A across the stationary transfer surface 26 or skid beams 27 and onto the now fully extended forks 30.

At the configuration depicted in FIG. 6d, the extension forks have been pushed forward to the limits of their travel so that the majority of each extension fork 30 is directly over the pallet P. With this arrangement, the extension forks 30 can be supported by the pallet P as the weight of the article A bears down on the ends of the forks 30. To facilitate sliding of the article A across the forks, the extension forks 30 can be formed of a smooth steel or plastic material. Both the extension forks 30 and the skid beams 27 can also include a low-friction coating, such as a TEFLON® coating, to facilitate sliding of the article A.

The extension fork assembly 25 can include position sensors or limit switches to determine whether the extension forks 30 have reached a limit of their travel. The position sensors or limit switches can be associated with the lead screws 44 and drive nuts 45, or with the extension forks 30. Tripping of position sensors or limit switches can be used to engage/activate or disengage/deactivate the drive mechanism 40. The sensors/switches can stop or start the motor 50 or can be arranged to engage or disengage the transmission 49.

In the preferred embodiment, limit switches are situated adjacent one lead screw at opposite ends thereof. The limit switches shut down the motor 50 and thereby stop the rotation of the lead screws 44 when the forks are at their fully retracted position, as represented in FIG. 6a, and at their fully extended position, as represented in FIG. 6d.

An additional limit switch can be disposed mid-way along the length of the lead screw 44. This limit switch can be electrically tied to the pusher drive 15 to activate the pusher bar 14 according to the timing mentioned above. The location of the limit switch can be determined by the rate of extension of the forks 30 and the pushing speed of the pusher bar 14. For instance, in the preferred method, the extension forks 30 reach their full extension and are disengaged well before the pusher bar 14 has pushed the article A over the pallet P. Most preferably, the forks 30 are fully extended before the article A reaches the forks themselves. Thus, the additional limit switch can be situated to give the extension forks a "head start". One arrangement of limit switches is depicted in FIG. 6c, with switch $SW_1$ determining the fully retracted position of the forks, switch $SW_2$ establishing the fully extended position, and switch $SW_3$ setting the point at which the pusher mechanism is activated.

Appropriate sensors or limit switches can also detect when the pusher bar 14 has traveled to its farthest forward and rearward extent. The limit switch can be associated with the pusher bar 14 or its associated drive 15. When the pusher limit switch determines that the pusher bar has traveled its farthest forward extent, it is known that the article A is positioned directly above the pallet P. At this point, then, the pusher limit switch can activate the extension fork drive mechanism 40 to reverse the lead screw rotation, thereby retracting each of the extension forks 30. At this point, the pusher bar 14 remains fully extended while the extension forks are retracted, as illustrated in FIGS. 6d–e.

Once the extension fork assembly 25 has been fully retracted, the first limit switch $SW_1$ can issue a command to the pusher drive 15 to cause the drive to retract the pusher bar 14. The pusher bar 14 continues to retract until a pusher limit switch indicates that it has reached the opposite end of its travels. At this point, the article A has been safely and cleanly loaded onto the pallet P and the second conveyor $C_2$ can be activated to discharge the loaded pallet.

As shown in FIG. 3, the beveled tip 31 of the extension forks 30 has a relatively short extent and steep angle of bevel. In an alternative embodiment depicted in FIGS. 7a–7b, a fork 60 can have a beveled tip 63 that is much more gradual. In some cases, the article A to be loaded onto the pallet P has a high center of gravity and/or narrow width.

Figure 6E:
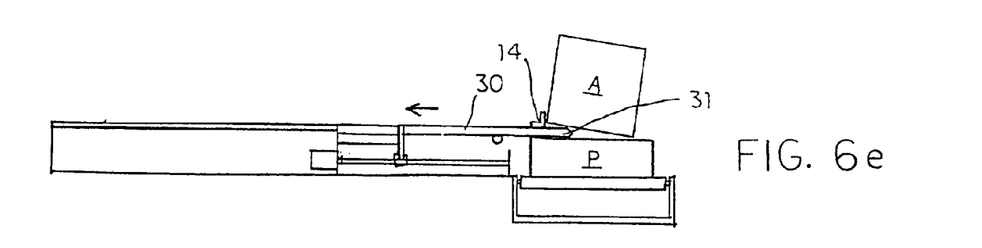
Figure 6F:
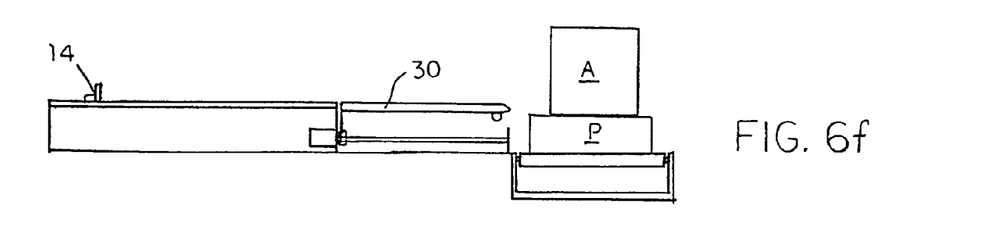

The abrupt change in height as the beveled tip 30 is withdrawn from underneath the article A (as illustrated in FIG. 6e) can be enough to topple the article A. Thus, with a longer more gradual bevel, such as the tip 63 shown in FIG. 7a, the height transition is more gradual as the extension fork 60 as removed, and the article does not tip over.

Figure 7A:
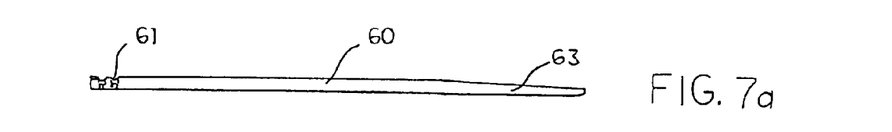
FIGS. 7a–7b are side and top elevational views of an extension fork in accordance with one embodiment of the present invention.
Figure 7B:
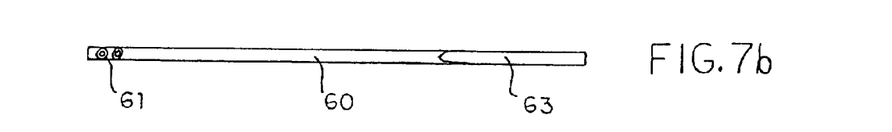

As further depicted in FIGS. 7a–7b, the fork 60 includes an attachment end 61. This attachment end preferably permits screw attachment of the extension fork 60 to the trolley assembly 38. The attachment end 61 permits easy removal and replacement of a worn or damaged fork.

Referring back to FIGS. 2 and 5, it can be seen that the transfer apparatus 10 can include two adjacent transfer stations or extension fork assemblies 25 arranged side-by-side. In a preferred embodiment of the invention, two articles A can be conveyed onto the adjacent portions of the transfer apparatus 10 to be loaded onto adjacently disposed pallets on the conveyor $C_2$. Alternatively, a single large article A can be transferred that spans across the entire width of the transfer apparatus 10.

While the invention has been illustrated and described in detail in the drawings and foregoing description, the same is to be considered as illustrative and not restrictive in character. It should be understood that only the preferred embodiments have been shown and described and that all changes and modifications that come within the spirit of the invention are desired to be protected.

For example, the transfer apparatus 10 in the illustrated includes a motor driven pusher mechanism to propel the article A onto the pallet P. Alternatively, the article A can be fed be gravity onto the pallet and an appropriate mechanism can be implemented to tilt the input portion 12 of the apparatus 10. In this instance, a gate or bar could be provided in lieu of the pusher bar 14 to hold the article A over the pallet as the extension forks are withdrawn.

As a further alternative, the skid beams 27 forming the stationary transfer surface 26 can include rollers to further reduce the friction between the article A and the stationary transfer surface. In addition, the transfer surface can be powered to propel the article A across the surface to the waiting extended forks.

What is claimed is:

1. An apparatus for loading an article from a first conveyor section onto a pallet situated on a second conveyor section, comprising:
    a pusher mechanism for pushing the article from the first conveyor section toward the pallet on the second conveyor section; and
    an extension fork assembly including;
        a stationary transfer surface between the first conveyor section and the second conveyor section configured to support the article as it is pushed by said pusher mechanism thereacross;
        a number of elongated forks configured to support the article as it is pushed by said pusher mechanism thereacross; and
        a drive mechanism connected to said number of forks and operable to move said number of forks between a retracted position adjacent said stationary transfer surface and an extended position adjacent the pallet on the second conveyor section,
    wherein said extension fork assembly includes means for supporting a free end of each of said number of elongated forks, and said drive mechanism is connected to each of said number of forks at an opposite end thereof.

2. The apparatus according to claim 1, wherein each of said number of elongated forks includes a tapered free end.

3. The apparatus according to claim 1, wherein said extension fork assembly includes: at least one guide channel disposed between said pusher mechanism and the second conveyor section; and at least one trolley assembly connecting said opposite end of said number of elongated forks to said drive mechanism and translatably disposed within a corresponding guide channel.

4. The apparatus according to claim 3, wherein said at least one trolley assembly includes a substantially vertical roller and a substantially horizontal roller arranged for rolling engagement with said corresponding guide channel.

5. The apparatus according to claim 1, wherein said stationary transfer surface includes a number of elongated beams extending between the first conveyor section and the second conveyor section.

6. The apparatus according to claim 5, wherein each of said number of elongated beams includes an upper surface defining said stationary transfer surface.

7. The apparatus according to claim 6, wherein said upper surface of said number of elongated beams is curved.

8. The apparatus according to claim 5, wherein said extension fork assembly includes a plurality of elongated beams and a plurality of elongated forks interleaved with said plurality of elongated beams.

9. The apparatus according to claim 8, wherein each of said plurality of elongated beams includes an upper surface defining said stationary transfer surface.

10. The apparatus according to claim 9, wherein said upper surface of said number of elongated beams is curved.

11. The apparatus according to claim 8, wherein each of said plurality of elongated forks includes an upper surface configured to support the article as it is pushed by said pusher mechanism thereacross.

12. The apparatus according to claim 11, wherein said upper surface of each of said plurality of elongated forks is situated at or below said stationary transfer surface.

13. An apparatus for loading an article from a first conveyor section onto a pallet situated on a second conveyor section, comprising:
    a pusher mechanism for pushing the article from the first conveyor section toward the pallet on the second conveyor section; and
    an extension fork assembly including;
        a stationary transfer surface between the first conveyor section and the second conveyor section configured to support the article as it is pushed by said pusher mechanism thereacross;
        a number of elongated forks configured to support the article as it is pushed by said pusher mechanism thereacross; and
        a drive mechanism connected to said number of forks and operable to move said number of forks between a retracted position adjacent said stationary transfer surface and an extended position adjacent the pallet on the second conveyor section,
    wherein said drive mechanism includes: at least one lead screw; a drive nut threadedly engaged on said lead screw and connected to said number of forks; and a motor operably coupled to said lead screw for rotating said at least one lead screw, whereby rotation of said lead screw causes said drive nut to traverse the length of said lead screw to move said number of elongated forks between said retracted and extended positions.

14. The apparatus according to claim 13, wherein said drive mechanism includes; two lead screws disposed apart from each other in parallel arrangement and each operably coupled to said motor; and two drive nuts, one each threadedly engaged with a corresponding one of said two lead screws, each of said drive nuts connected to said number of forks.

* * * * *

UNITED STATES PATENT AND TRADEMARK OFFICE
CERTIFICATE OF CORRECTION

PATENT NO.   : 6,866,469 B2
DATED        : March 15, 2005
INVENTOR(S)  : Harris et al.

It is certified that error appears in the above-identified patent and that said Letters Patent is hereby corrected as shown below:

Column 6,
Line 25, replace "In addition, (paragraph omitted)" should be changed to:
-- In addition, as depicted in Fig. 5, the forks can define a curved upper surface 32. Most preferably, the forks 30 have a circular cross-section, except at the beveled tip 31. --

Signed and Sealed this

Twenty-eighth Day of June, 2005

JON W. DUDAS
*Director of the United States Patent and Trademark Office*